US012793667B2

(12) United States Patent
Kato

(10) Patent No.: US 12,793,667 B2
(45) Date of Patent: Nov. 10, 2026

(54) VEHICLE CONTROL SYSTEM

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/228,872

(22) Filed: Jun. 5, 2025

(65) Prior Publication Data

US 2025/0391385 A1 Dec. 25, 2025

(30) Foreign Application Priority Data

Jun. 25, 2024 (JP) ................................ 2024-101905

(51) Int. Cl.
*G09G 3/36* (2006.01)
*B60K 35/22* (2024.01)
*B60K 35/81* (2024.01)

(52) U.S. Cl.
CPC ............... *G09G 3/36* (2013.01); *B60K 35/22* (2024.01); *B60K 35/81* (2024.01); *B60K 2360/349* (2024.01); *G09G 2320/0686* (2013.01); *G09G 2380/10* (2013.01)

(58) Field of Classification Search
CPC ............. G09G 3/36; G09G 2320/0686; G09G 2380/10; B60K 35/22; B60K 35/81; B60K 2360/349; B60K 35/10; B60K 35/28; B60K 35/29; B60K 35/60
See application file for complete search history.

(56) References Cited

U.S. PATENT DOCUMENTS

| | | | | |
|---|---|---|---|---|
| 9,418,547 | B2 * | 8/2016 | Bolton | G08G 1/0962 |
| 9,889,794 | B2 * | 2/2018 | Wengelnik | B60K 35/10 |
| 10,303,961 | B1 * | 5/2019 | Stoffel | B60Q 1/507 |
| 10,351,057 | B2 * | 7/2019 | Ohashi | B60K 35/28 |
| 11,718,314 | B1 * | 8/2023 | Nallani | B60K 35/22 340/903 |
| 12,128,820 | B1 * | 10/2024 | Mora Ortiz | B60Q 3/54 |
| 2010/0014711 | A1 * | 1/2010 | Camhi | G06T 7/70 382/104 |

(Continued)

FOREIGN PATENT DOCUMENTS

JP 2022-176616 A 11/2022

*Primary Examiner* — Ibrahim A Khan
(74) *Attorney, Agent, or Firm* — Rimon P.C.

(57) ABSTRACT

A vehicle control system includes one or more processors and a storage medium storing a program configured to be executed by the one or more processors. The program includes one or more instructions that are configured to cause the one or more processors to perform: a designating process of designating a light-emission reporting zone in a vehicle interior of a vehicle according to a direction or a position related to reporting; and a control process of causing an ambient light and a display of the vehicle to perform cooperative light emission in the light-emission reporting zone designated by the designating process. The ambient light has a linear portion extending at least in a vehicle transverse direction in the vehicle interior, and the display is disposed in a dashboard of the vehicle so as to divide or cover a part of the linear portion of the ambient light.

7 Claims, 10 Drawing Sheets

(56) References Cited

U.S. PATENT DOCUMENTS

| | | | | |
|---|---|---|---|---|
| 2011/0178670 | A1* | 7/2011 | Perkins | B60K 35/22 340/439 |
| 2016/0059777 | A1* | 3/2016 | Malone | B60K 35/21 340/426.1 |
| 2019/0016262 | A1* | 1/2019 | Thiebaud | B60K 35/21 |
| 2021/0325181 | A1* | 10/2021 | Ziebart | B60K 35/10 |
| 2022/0363188 | A1* | 11/2022 | Nakajima | B60K 35/213 |
| 2022/0410922 | A1* | 12/2022 | Koh | B60K 35/10 |
| 2023/0311753 | A1* | 10/2023 | Hattori | B60Q 3/80 340/540 |
| 2024/0294115 | A1* | 9/2024 | Komatsu | B60R 1/22 |
| 2025/0276637 | A1* | 9/2025 | Barry | B60Q 3/16 |

* cited by examiner

VEHICLE CONTROL SYSTEM

CROSS-REFERENCE TO RELATED APPLICATIONS

The present application claims priority from Japanese Patent Application No. 2024-101905 filed on Jun. 25, 2024, the entire contents of which are hereby incorporated by reference.

BACKGROUND

The disclosure relates to a vehicle control system, and in particular, to the control of an ambient light and a display in a vehicle interior.

Japanese Unexamined Patent Application Publication No. 2022-176616 describes a display device for a vehicle in which a display panel and a linear display are disposed in a dashboard of an automobile so as to be capable of linked light emission.

SUMMARY

An aspect of the disclosure provides a vehicle control system configured to be applied to a vehicle. The vehicle control system includes: one or more processors and a storage medium storing a program configured to be executed by the one or more processors. The program includes one or more instructions, and the one or more instructions are configured to cause the one or more processors to perform: a designating process of designating a light-emission reporting zone in a vehicle interior of the vehicle according to a direction or a position related to reporting and a control process of causing an ambient light and a display to perform cooperative light emission in the light-emission reporting zone designated by the designating process. The ambient light has a linear portion extending at least in a vehicle transverse direction in the vehicle interior, and the display is disposed in a dashboard of the vehicle so as to divide or cover a part of the linear portion of the ambient light.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

In some vehicles, a display including a meter display unit and a center information display (CID) is mounted. The meter display unit including a speedometer and a tachometer is configured to display information that is related to traveling of an automobile and that is to be checked by a driver who drives the automobile, and the CID is configured to display information such as navigation data. For example, a display such as a liquid crystal panel is disposed in the dashboard.

In addition, there is also a device, which is called an ambient light, configured to provide illumination or environmental lighting in the vehicle interior. For example, an ambient light may have a linear portion extending in the transverse direction and the longitudinal direction so as to surround the vehicle interior.

The ambient light may also be used to provide a warning or other reporting to the driver who drives the vehicle.

However, it may be difficult for the driver to recognize the reporting by the ambient light. For example, in a case of a structure in which the linear portion of the ambient light is divided or covered by a display such as a meter display unit in the dashboard in front of the driver, the ambient light is less likely to enter the field of view of the driver who mainly gazes forward during driving.

In view of this, the disclosure proposes a technique for enabling the reporting by the ambient light to be intuitively recognized in a vehicle equipped with a display for meter display, navigation, or the like located on the extension line of the ambient light.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
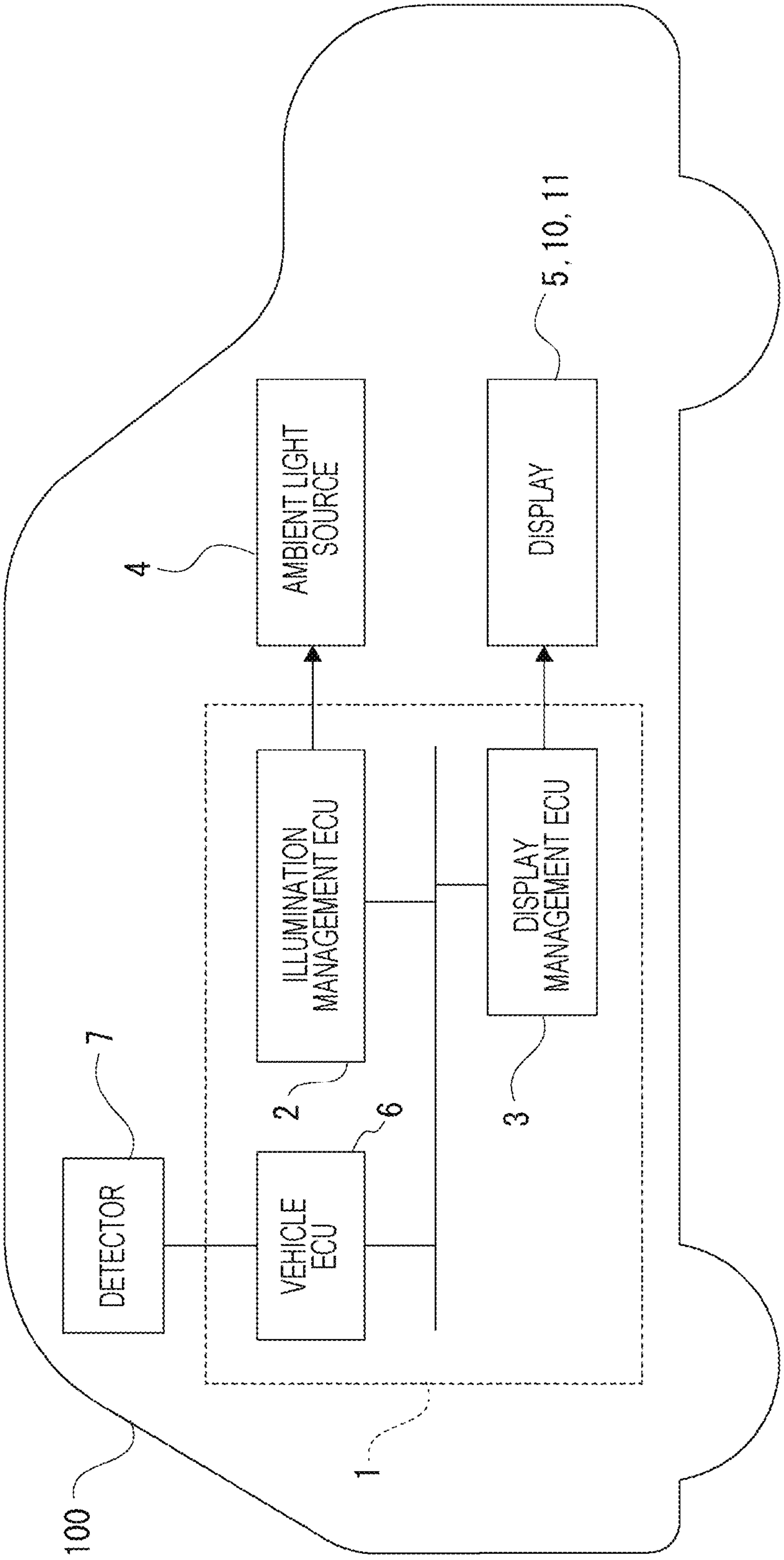
FIG. 1 is a block diagram of a vehicle control system according to an embodiment of the disclosure.

FIG. 1 illustrates an outline of a configuration of a vehicle 100 including a vehicle control system 1 according to the embodiment.

The vehicle 100 is configured as, for example, a four-wheel automobile, and includes one or more of an engine and a traction motor as the driving source for the wheels. That is, the vehicle 100 may be configured as an electric vehicle (EV) having only a traction motor, a hybrid electric vehicle (HEV) having both an engine and a traction motor, or an engine-driven vehicle having only an engine out of an engine and a traction motor as the driving source for the wheels.

The vehicle control system 1 includes one or more processors. Specifically, the vehicle control system 1 includes one or more electronic control units (ECUs) in the vehicle 100. In FIG. 1, a vehicle ECU 6, an illumination management ECU 2, and a display management ECU 3 are illustrated.

Figure 2:
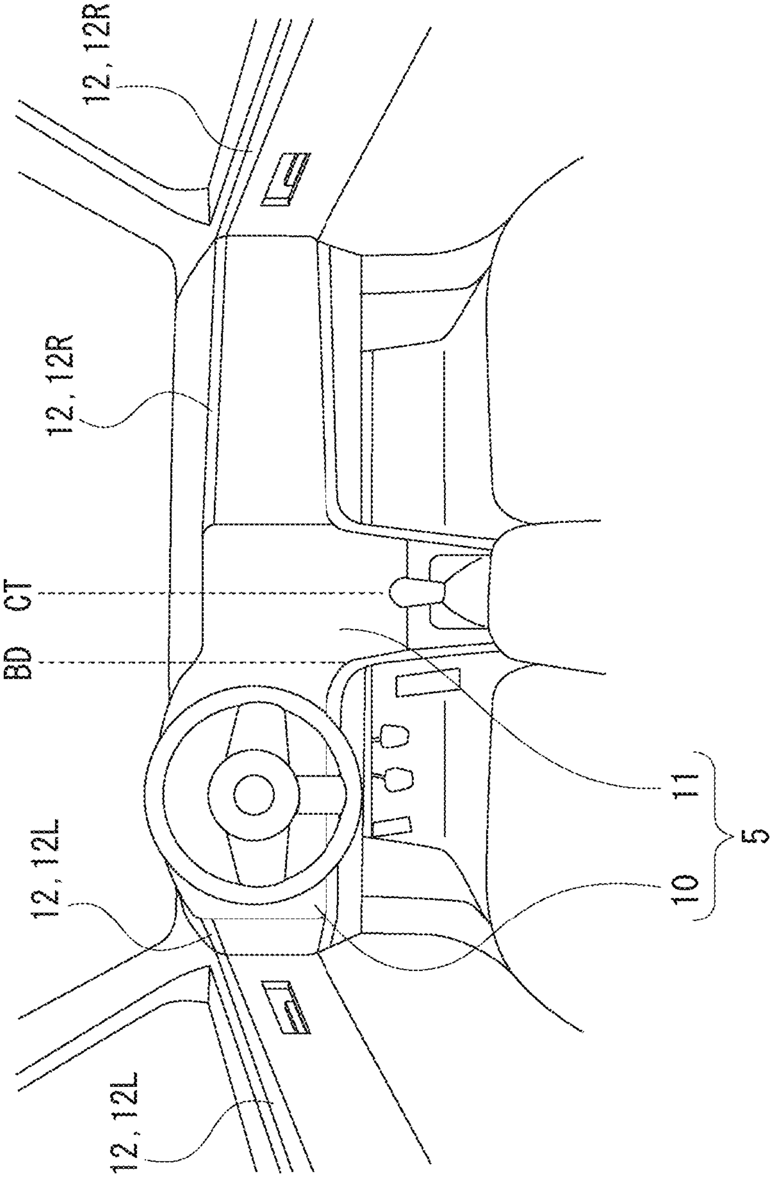
FIG. 2 is an explanatory diagram of a display and an ambient light in a vehicle according to the embodiment.

The illumination management ECU 2 is an ECU configured to control the light emission state of an ambient light source 4 including an ambient light 12 illustrated in FIG. 2 and other drawings.

The display management ECU 3 is an ECU configured to control display by a display 5.

The vehicle ECU 6 collectively represents various types of ECUs mounted on the vehicle 100. The vehicle 100 may include various types of ECUs such as a traveling control ECU, a battery control ECU, an engine control ECU, a driving support ECU, an autonomous driving ECU, and an air-conditioning control ECU. The vehicle ECU 6 may include any one of these ECUs or a plurality of ECUs in the vehicle 100.

The vehicle ECU 6 is configured to transmit vehicle setting information IF1 and reporting target information IF2, which will be described later with reference to FIG. 11, to the illumination management ECU 2 and the display management ECU 3.

The ECUs in the vehicle 100 can communicate with each other via, for example, a controller area network (CAN).

Although the vehicle ECU 6, the illumination management ECU 2, and the display management ECU 3 are illustrated in FIG. 1, an ECU in which these ECUs are integrated may be provided to perform the process according to the present embodiment.

As described above, the vehicle control system 1 includes one or more ECUs. Each of the ECUs includes a processor including a central processing unit (CPU), a read only memory (ROM), a random access memory (RAM), a nonvolatile memory, and an input/output interface. The CPU is configured to execute various processes in accordance with a program stored in the ROM or the nonvolatile memory. The RAM is configured to appropriately store data and the like necessary for the CPU to execute various kinds of processes.

Cooperative light emission according to the present embodiment, which will be described later, is achieved by a program launched on the CPU.

A detector 7 collectively represents various sensors, cameras, and the like mounted on the vehicle 100. The detector 7 is configured to detect information serving as a trigger for reporting by the ambient light 12.

For example, the detector 7 includes a camera capable of capturing an image of the area in front of the vehicle 100 within a predetermined field of view and an image processor configured to perform various kinds of processes on an image acquired from the camera, and the detector 7 is configured to detect a person or an obstacle outside the vehicle 100. The detector 7 may also include a camera configured to capture images of the areas behind the vehicle 100 and to the sides of the vehicle 100.

In addition, the detector 7 may include a device capable of detecting a relative distance to an object, such as a millimeter wave radar or a LiDAR.

Further, the detector 7 may include a vehicle interior camera, a weight sensor for a seat, a contact sensor located at each part in the vehicle interior, a microphone configured to pick up a voice of an occupant.

In addition, the detector 7 may include a sensor configured to detect a state of each part of the mechanism of the vehicle 100, such as a motor, an engine, a battery, a steering mechanism, or a braking mechanism.

The detector 7 may include a sensor configured to detect a traveling state of the vehicle 100, such as an acceleration sensor, an angular velocity sensor, a yaw rate sensor, or an inclination sensor.

The ambient light source 4 and the display 5 will be described with reference to FIG. 2.

The ambient light source 4 includes a light emitting unit including, for example, an array of light emitting diodes (LEDs) as the ambient light 12 and a light emission driving circuit for the light emitting unit. The location of the ambient light 12 in the vehicle interior depends on the vehicle type. For example, the ambient light 12 having a linear portion may be provided in a dashboard at the front of the vehicle interior, on a side surface of the vehicle interior, and at other locations in the vehicle interior. The ambient light 12 serves as environmental lighting or illumination that forms an atmosphere in the vehicle interior, and various locations and various light emission modes are possible.

In the present embodiment, as illustrated in FIG. 2, the ambient light 12 having a linear portion is provided in the vehicle transverse direction in the dashboard at the front, and the linear portion is provided to continuously extend into the side doors. In addition to the ambient light 12 illustrated in FIG. 2, the ambient light 12 may be provided, for example, in the periphery of a rear seat and a portion near the ceiling.

The display 5 is, for example, a display device including a liquid crystal display panel and provides a meter display unit 10 and a CID 11 located separately or as a single unit in the present embodiment.

The meter display unit 10 is provided in front of the driver's seat and displays various indicators, such as a speedometer, a tachometer, a gear position, a thermometer, a fuel gauge, and a battery gauge, which are checked by the driver during driving. A speedometer and other indicators may be provided as physical indicators, and a liquid crystal panel may be provided near the physical indicators to display various kinds of information.

The CID 11 is a display device configured to display, for example, a navigation screen, an audio interface screen, a video screen, and other various functional screens. The CID 11 is disposed, for example, at the center position in the vehicle transverse direction.

In the example illustrated in FIG. 2, the meter display unit 10 and the CID 11 look like an integrated display in appearance. An internal liquid crystal display panel may include the meter display unit 10 and the CID 11 separately. Alternatively, an integrated internal display panel may be used, and a region near the center of the vehicle may be used for the CID 11 and a region on the driver's seat side may be used for the meter display unit 10. Further, the meter display unit 10 and the CID 11 may be provided as display devices having separate display panels and separate housings.

In FIG. 2, a vehicle center line CT and a display boundary BD are indicated by dashed lines.

The vehicle center line CT indicates the center position of the vehicle 100 in the vehicle transverse direction.

The display boundary BD indicates the boundary between the meter display unit 10 and the CID 11.

In the example illustrated in FIG. 2, the dashboard located at the front of the vehicle 100 includes the ambient light 12 having a linear portion in the vehicle transverse direction and the display 5 (the meter display unit 10 and the CID 11) disposed in the dashboard so as to divide or cover a part of the linear portion of the ambient light 12.

That is, the ambient light 12 at the front in the vehicle interior is divided into an ambient light 12L on the left side of the display 5 and an ambient light 12R on the right side of the display 5.

Thus, if the ambient light 12L having a linear portion is extended to the right, the ambient light 12L extends into the display 5, and if the ambient light 12R having a linear portion is similarly extended to the left, the ambient light 12R extends into the display 5.

Hereinafter, cooperative light emission by the ambient light 12 and the display 5 (the meter display unit 10 and the CID 11) will be described.

In the cooperative light emission according to the present embodiment, the display 5 is configured to provide light emission display in cooperation with light emission for reporting by the ambient light 12.

For example, in response to an event to be reported being detected outside the vehicle 100, the vehicle control system 1 causes the ambient light 12 to emit light in a predetermined light emission mode, as the reporting by the ambient light 12, in accordance with the direction of the event as viewed from the vehicle 100 or the driver to warn or alert the driver, and the vehicle control system 1 causes the display 5 to provide a display in the same or a similar light emission mode.

Figure 3:
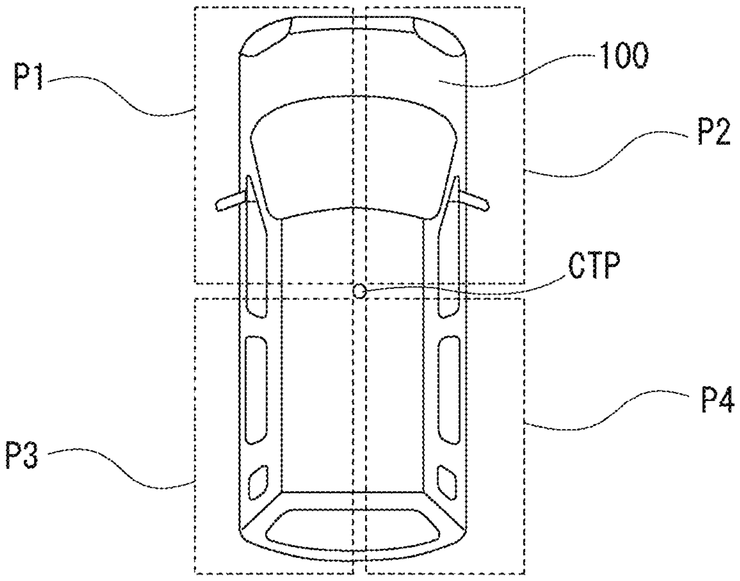
FIG. 3 is an explanatory diagram of zone setting of the vehicle according to the embodiment.

For this purpose, as illustrated in FIG. 3 as an example, the vehicle control system 1 is configured to designate zones relative to the center point CTP of the vehicle 100 as the reference point. There are a left front zone P1, a right front zone P2, a left rear zone P3, and a right rear zone P4.

For example, when an event to be warned of occurs in the left front direction outside the vehicle 100, the ambient light 12 in the zone P1 is caused to emit light in a predetermined light emission mode. When an event to be warned of occurs in the right front direction outside the vehicle 100, the ambient light 12 in the zone P2 is caused to emit light in a predetermined light emission mode.

For example, reporting by the ambient light 12 in each zone P1, P2, P3, or P4 can basically be provided as described above. To enable the occupant, in particular, the driver, to more easily recognize the reporting by the ambient light 12, the vehicle control system 1 causes the display 5 to provide cooperative light emission display.

Figure 4:
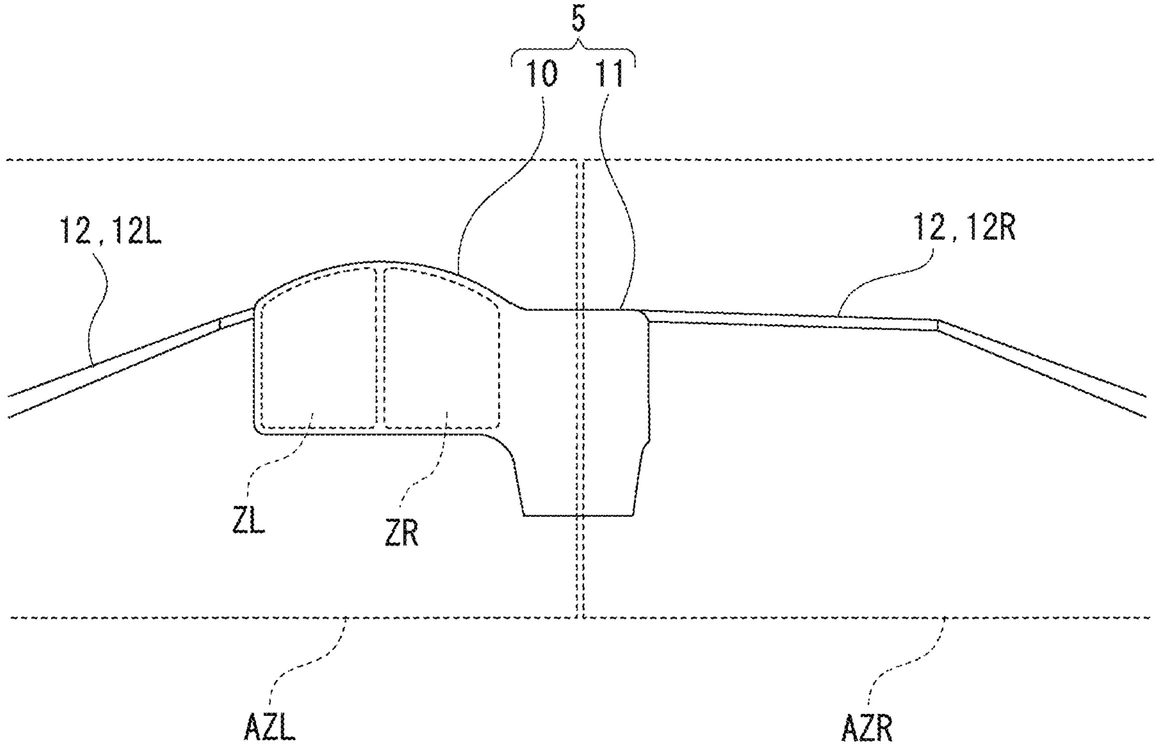
FIG. 4 is an explanatory diagram of zone setting of the display and the ambient light according to the embodiment.

FIG. 4 illustrates an example of zone setting for cooperative light emission. FIG. 4 extracts from FIG. 2 and illustrates the ambient light 12 (12L and 12R) and the display 5 (the meter display unit 10 and the CID 11) located in the dashboard and the left and right door portions.

For example, the vehicle control system 1 designates a zone AZL in front of the driver's seat and a zone AZR in front of the passenger's seat after combining the ambient light 12 and the display 5. The boundary between these zones AZL and AZR is the vehicle center line CT.

In addition, the vehicle control system 1 designates a left zone ZL and a right zone ZR for the meter display unit 10. This is a zone setting that divides the meter display unit 10, which is in front of the driver, substantially at the center into the left and right halves, and this zone setting enables the driver to recognize reporting on the right side and the left side while maintaining a forward-facing gaze.

Figure 5:
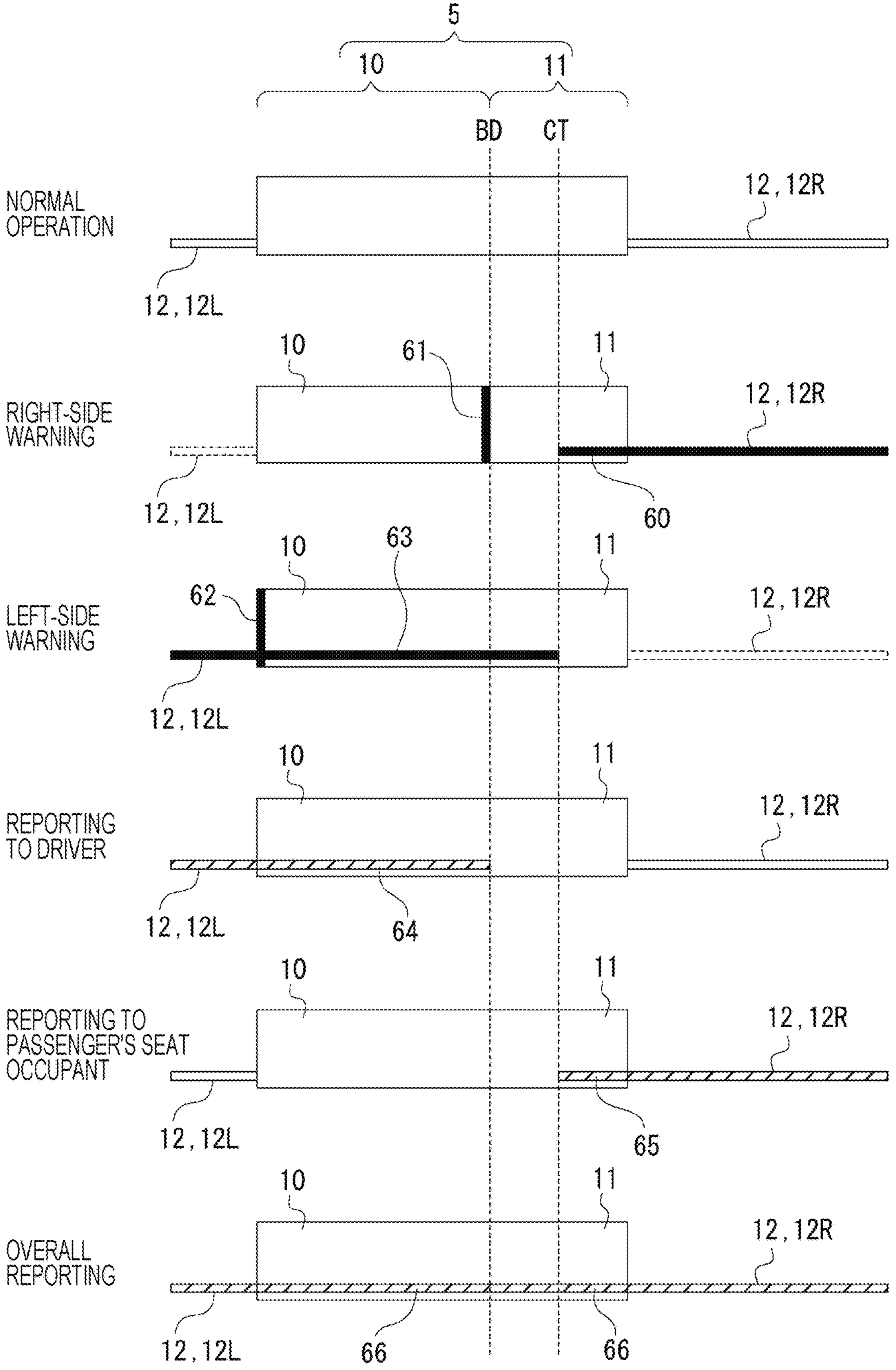
FIG. 5 is an explanatory diagram of cooperative light emission according to the embodiment.

Cooperative light emission will be described with reference to FIG. 5. FIG. 5 schematically illustrates the display 5 represented by a rectangle and the ambient lights 12L and 12R having a linear portion located on both sides of the display 5.

Regarding the ambient light 12, a white portion indicates normal light emission, a solid portion indicates, for example, red light emission, and a hatched portion indicates, for example, yellow light emission. The ambient light 12 represented by dashed lines indicates a state of no emission.

Regarding the display 5 (the meter display unit 10 and the CID 11), a white portion indicates normal display of various kinds of information, a solid portion indicates, for example, display in red, and a hatched portion indicates, for example, display in yellow.

The above-described colors, red and yellow, are examples indicating that the light emission from the ambient light 12 differs from the normal light emission. These are non-limiting examples in which reporting of a warning is displayed in red and reporting other than a warning is displayed in yellow.

The topmost diagram in FIG. 5 illustrates a display state during normal operation. In this state, reporting by the ambient light 12 is not provided. The ambient lights 12L and 12R provide normal illumination. The ambient lights 12L and 12R need not emit light. The meter display unit 10 displays normal indicators, and the CID 11 displays, for example, a navigation screen.

The second diagram from the top in FIG. 5 illustrates cooperative light emission at the time of a right-side warning. This is the cooperative light emission for reporting to the driver an event that has occurred on the right front side of the vehicle 100. The vehicle control system 1 causes the ambient light 12R to provide a display in red and causes the ambient light 12L not to provide a display. Further, the vehicle control system 1 provides a linear display 60 in a region on the right side of the vehicle center line CT in the CID 11 and provides an alerting display 61 in the zone ZR in the meter display unit 10.

The linear display 60 in this case has a straight line, a curved line, or a mixture of a straight line and a curved line that extends the ambient light 12R to the left into the CID 11 and performs light emission in the same light emission mode as the ambient light 12R.

While a light emission mode is specified by color, brightness (luminance), and cycle, at least one of these parameters or more than one of these parameters are the same in the same light emission mode. For example, when the ambient light 12R is caused to emit red light, the linear display 60 is also caused to provide a display in red. When the ambient light 12R is caused to emit blinking red light, the linear display 60 is also caused to provide a synchronized blinking display in red with the same cycle. When the ambient light 12R is caused to emit red light with predetermined brightness, the linear display 60 is caused to provide a display in red with substantially the same brightness. In this way, the occupant is caused to recognize that the ambient light 12 emits warning light on the right side of the vehicle center line CT.

The alerting display 61 in the meter display unit 10 also causes the driver to recognize reporting by the ambient light 12. The alerting display 61 having a vertical linear shape is presented as an example. The alerting display 61 is provided in a part of the zone ZR (see FIG. 4) in the right half of the meter display unit 10 in the same light emission mode as the ambient light 12R, so that the driver who is gazing at the front during driving can easily recognize that there is a warning by the ambient light 12 regarding the right front direction of the vehicle 100.

The third diagram from the top in FIG. 5 illustrates cooperative light emission at the time of left-side warning. This is the cooperative light emission for reporting to the driver an event that has occurred on the left front side of the vehicle 100. The vehicle control system 1 causes the ambient light 12L to provide a display in red and causes the ambient light 12R not to provide a display. Further, the vehicle control system 1 provides a linear display 63 in a region on the left side of the vehicle center line CT in the meter display unit 10 and the CID 11 and provides an alerting display 62 in the zone ZL in the meter display unit 10.

The linear display 63 in this case has a straight line, a curved line, or a mixture of a straight line and a curved line that extends the ambient light 12L to the right into the meter display unit 10 and the CID 11 and performs light emission in the same light emission mode as the ambient light 12L. For example, when the ambient light 12L is caused to emit red light, the linear display 63 is also caused to provide a display in red. When the ambient light 12L is caused to emit blinking red light, the linear display 63 is also caused to provide a synchronized blinking display in red with the same cycle. When the ambient light 12L is caused to emit red light with predetermined brightness, the linear display 63 is caused to provide a display in red with substantially the same brightness. In this way, the occupant is caused to recognize that the ambient light 12 emits warning light on the left side of the vehicle center line CT.

The alerting display 62 in the meter display unit 10 also causes the driver to recognize reporting by the ambient light 12. In particular, the alerting display 62 is provided in a part of the zone ZL (see FIG. 4) in the left half of the meter display unit 10 in the same light emission mode as the ambient light 12L, so that the driver who is gazing at the front during driving can easily recognize that there is a warning by the ambient light 12 regarding the left front direction of the vehicle 100.

The fourth diagram from the top in FIG. 5 illustrates cooperative light emission for providing some reporting to the driver.

The vehicle control system 1 causes the ambient light 12L to provide, for example, a display in yellow and causes the ambient light 12R to provide a normal display. Further, the vehicle control system 1 causes the meter display unit 10 to provide a linear display 64.

The linear display 64 in this case has a straight line, a curved line, or a mixture of a straight line and a curved line that extends the ambient light 12L to the right on the left side of the display boundary BD and performs light emission in the same light emission mode as the ambient light 12L. This enables the driver to recognize that the ambient light 12 emits light for some reporting at the position corresponding to the driver's seat.

In this case, the linear display 64 may be provided on the left side of the vehicle center line CT.

The fifth diagram from the top in FIG. 5 illustrates cooperative light emission for providing some reporting to the passenger's seat occupant.

The vehicle control system 1 causes the ambient light 12R to provide, for example, a display in yellow and causes the ambient light 12L to provide a normal display. Further, the vehicle control system 1 provides a linear display 65 in a region on the right side of the vehicle center line CT in the CID 11.

The linear display 65 in this case has a straight line, a curved line, or a mixture of a straight line and a curved line that extends the ambient light 12R to the left to the vehicle center line CT and performs light emission in the same light emission mode as the ambient light 12R. This enables the occupant to recognize that the ambient light 12 emits light for some reporting at the position corresponding to the passenger's seat.

The lowermost diagram in FIG. 5 illustrates cooperative light emission at the time of overall reporting, for example, for providing reporting to all the occupants in the vehicle or reporting regarding the forward direction.

The vehicle control system 1 causes the ambient lights 12L and 12R to provide, for example, a display in yellow and causes the meter display unit 10 and the CID 11 to provide a linear display 66.

The linear display 66 in this case has a straight line, a curved line, or a mixture of a straight line and a curved line that connects the ambient lights 12L and 12R and performs light emission in the same light emission mode as the ambient lights 12L and 12R. As a result, the ambient light 12 is made to appear to emit light in a linear form substantially uninterrupted by the display 5, and this enables all the occupants to recognize that the ambient light 12 emits light for some reporting.

For example, when a warning about an event related to the forward direction is to be reported, the overall reporting may be provided as a display in red to imply a more serious situation.

FIGS. 6 to 10 illustrate specific examples of cooperative light emission. In each figure, the ambient light 12 and the display 5 in FIG. 2 are illustrated in the upper part, and an event related to reporting and a setting for light-emission reporting zone are illustrated in the lower part.

Figure 6:
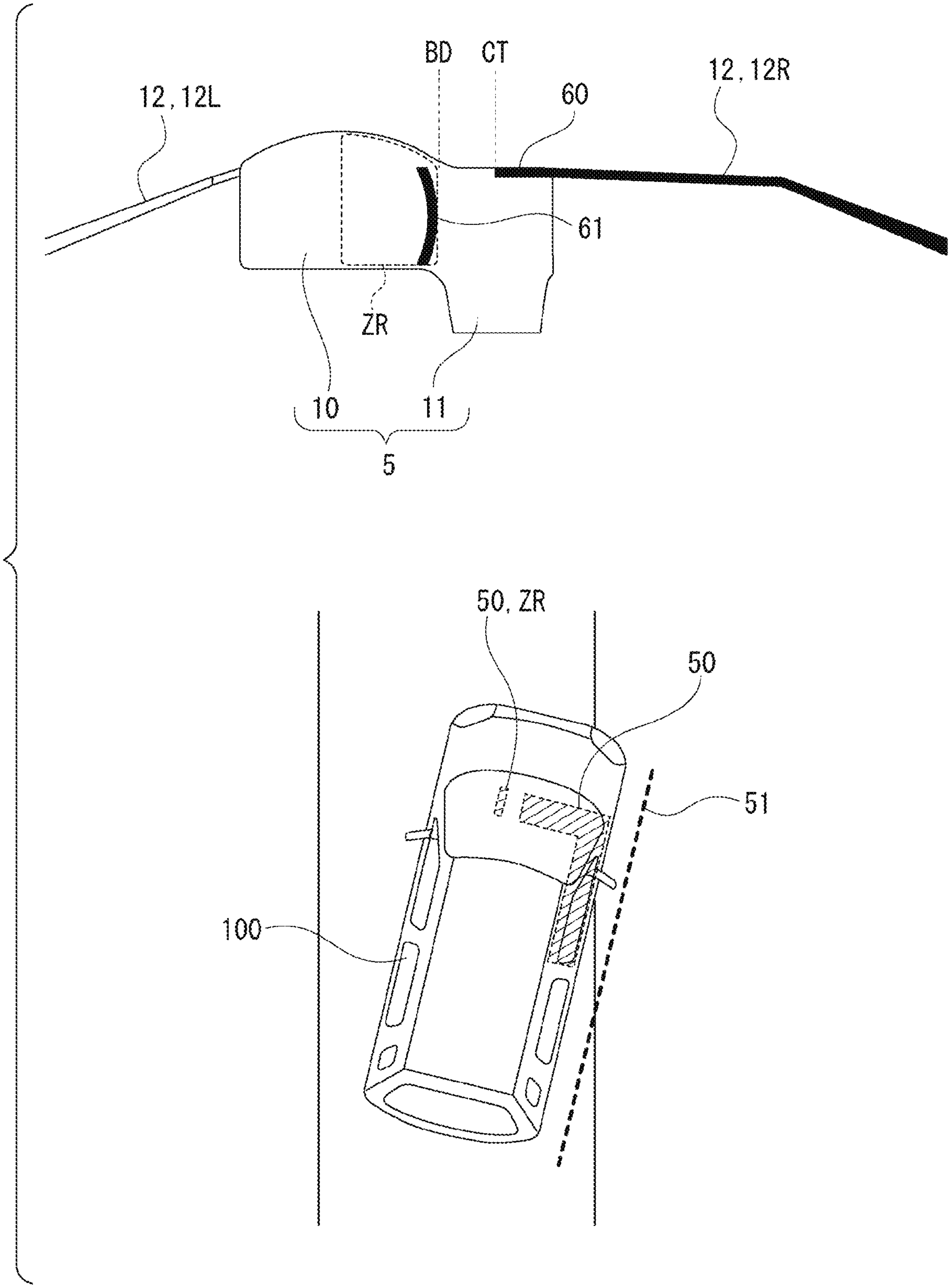
FIG. 6 is an explanatory diagram of cooperative light emission at the time of right-side warning according to the embodiment.

FIG. 6 illustrates cooperative light emission at the time of the right-side warning illustrated in the second diagram from the top in FIG. 5. The cooperative light emission provides the reporting to urge the driver to pay attention to the right side indicated as a vehicle exterior target position 51, for example, because the right side of the vehicle 100 has deviated from the travel lane as illustrated in the lower part of FIG. 6. Thus, the vehicle control system 1 designates the right front area in the vehicle interior as a light-emission reporting zone 50 for the ambient light 12.

In this case, the light-emission reporting zone 50 designated by the vehicle control system 1 is on the right side of the vehicle center line CT. That is, the area on the right side of the vehicle center line CT in the CID 11 and the ambient light 12R are included in the light-emission reporting zone 50.

The vehicle control system 1 also causes the zone ZR in the meter display unit 10 to be included in the light-emission reporting zone 50 for the driver.

The vehicle control system 1 performs the control described in the second diagram from the top in FIG. 5. That is, as illustrated in the upper part of FIG. 6, for example, the ambient light 12R is caused to emit red light, the ambient light 12L is turned off, the linear display 60 is provided in red in the CID 11, and the alerting display 61 is provided in red in the zone ZR of the meter display unit 10. This control enables the driver to easily recognize the warning about the right side.

Figure 7:
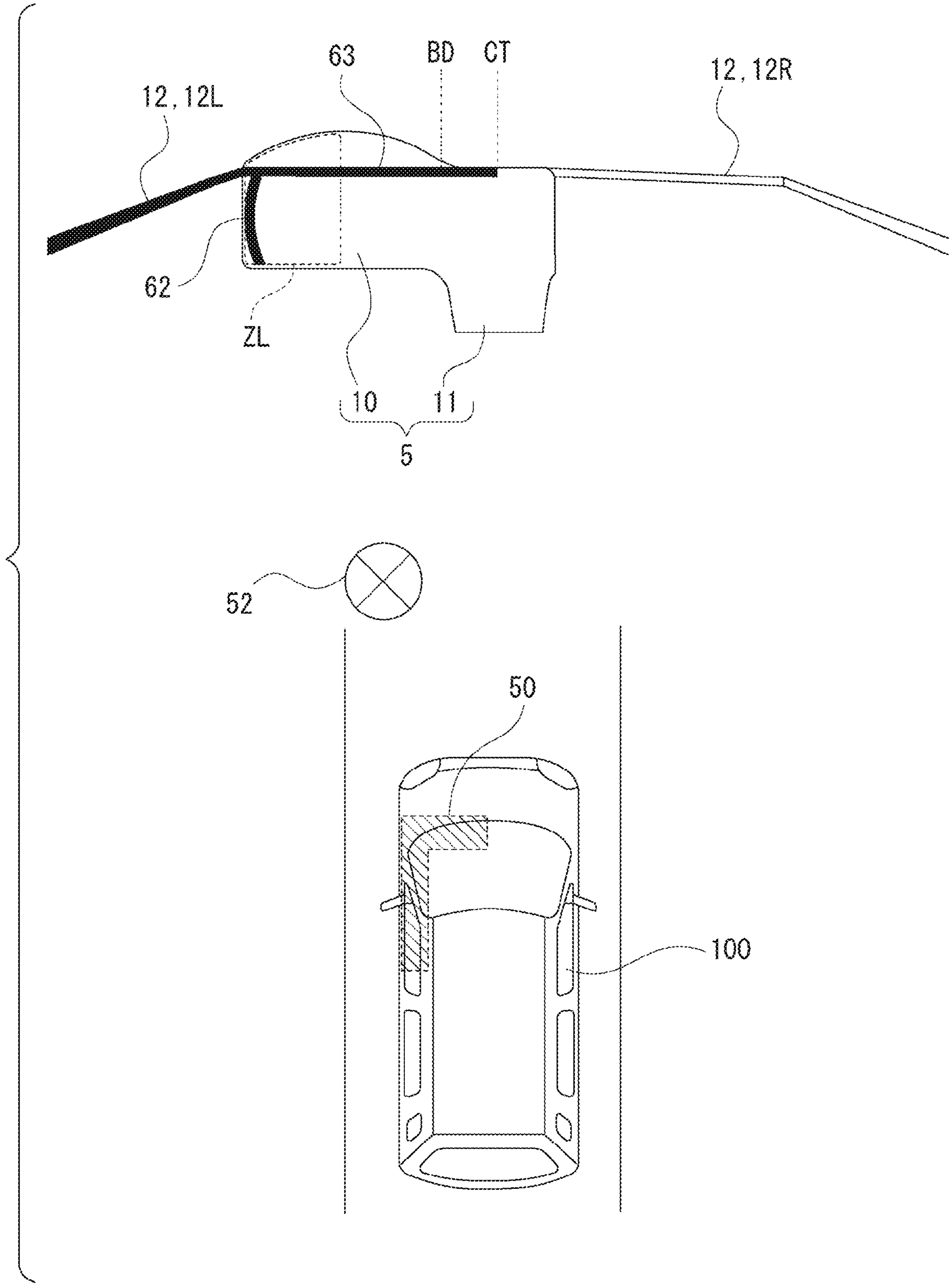
FIG. 7 is an explanatory diagram of cooperative light emission at the time of left-side warning according to the embodiment.

FIG. 7 illustrates cooperative light emission at the time of the left-side warning illustrated in the third diagram from the top in FIG. 5. The cooperative light emission provides the reporting to urge the driver to pay attention to the left side, for example, because an obstacle 52 is present on the left front side of the vehicle 100 as illustrated in the lower part of FIG. 7. Thus, the vehicle control system 1 designates the left front area in the vehicle interior as the light-emission reporting zone 50 for the ambient light 12.

In this case, the light-emission reporting zone 50 designated by the vehicle control system 1 is on the left side of the vehicle center line CT. That is, the area on the left side of the vehicle center line CT in the CID 11 and the ambient light 12L are included in the light-emission reporting zone 50.

Further, regarding the meter display unit 10, the vehicle control system 1 causes the zone ZL on the left side in the meter display unit 10 to be included in the light-emission reporting zone 50 for the alerting display 62 for the driver. In this case, it is assumed that only the alerting display 61 in the zone ZR on the right side is excluded from the light-emission reporting zone 50.

The vehicle control system 1 performs the control described in the third diagram from the top in FIG. 5. That is, as illustrated in the upper part of FIG. 7, for example, the ambient light 12L is caused to emit red light, the ambient light 12R is turned off, the linear display 63 is provided in red in the CID 11 and the meter display unit 10, and the alerting display 62 is provided in red in the zone ZL of the meter display unit 10. This control enables the driver to easily recognize the warning about the left side.

Figure 8:
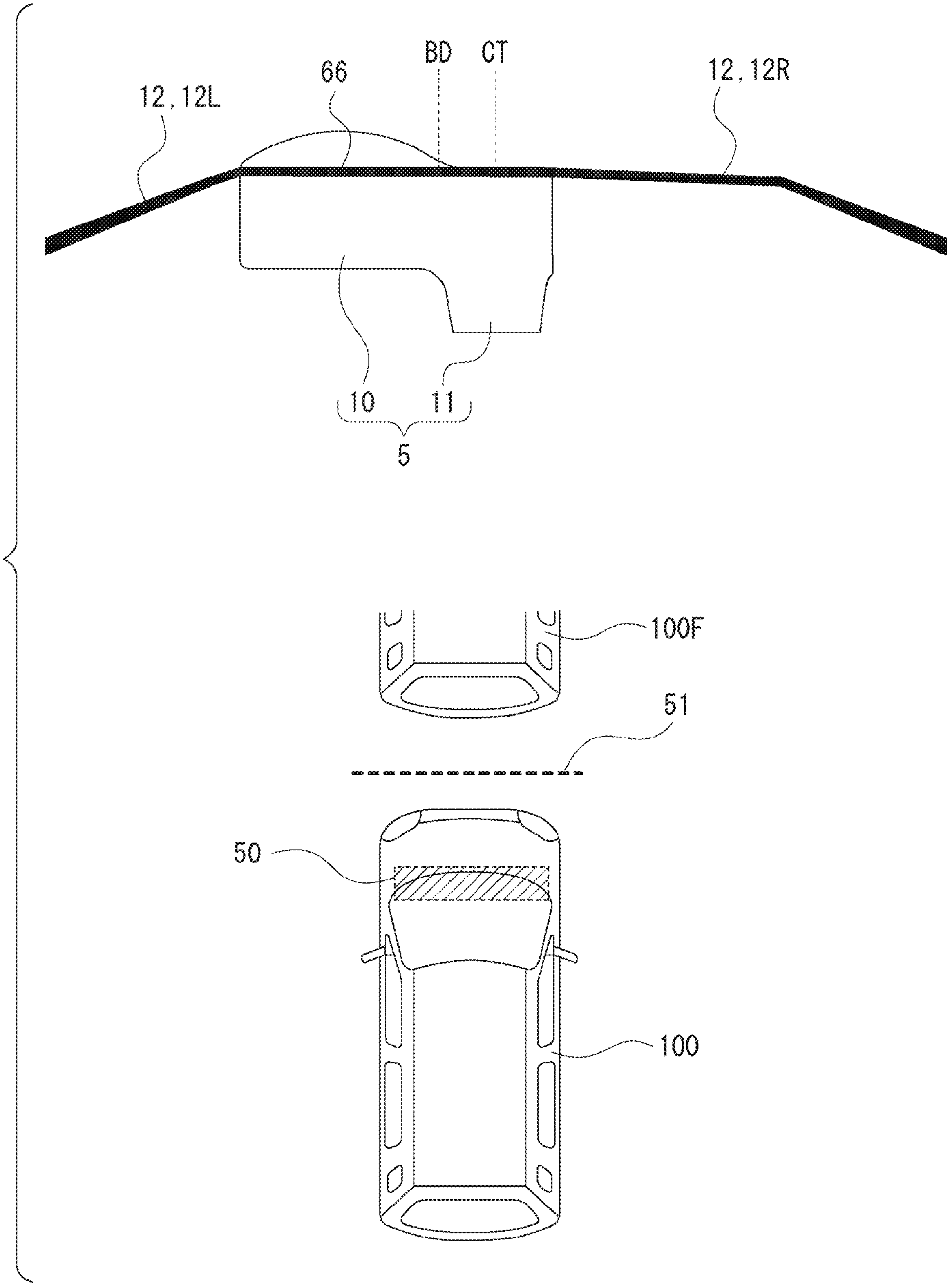
FIG. 8 is an explanatory diagram of cooperative light emission at the time of front warning according to the embodiment.

FIG. 8 illustrates cooperative light emission as the overall reporting illustrated in the sixth diagram from the top in FIG. 5 particularly in a case of a warning. The cooperative light emission provides the warning about the front indicated as the vehicle exterior target position 51, for example, due to the approach of the vehicle 100 to a preceding vehicle 100F as illustrated in the lower part of FIG. 8. Thus, the vehicle control system 1 designates the front area in the vehicle interior as the light-emission reporting zone 50 for the ambient light 12.

In this case, the light-emission reporting zone 50 designated by the vehicle control system 1 includes the entire area of the meter display unit 10, the entire area of the CID 11, and the ambient lights 12L and 12R.

As illustrated in the upper part of FIG. 8, for example, the vehicle control system 1 causes the ambient lights 12L and 12R to emit red light and causes the CID 11 and the meter display unit 10 to provide the linear display 66 in red. This control enables the occupant to easily recognize the warning about the front.

Figure 9:
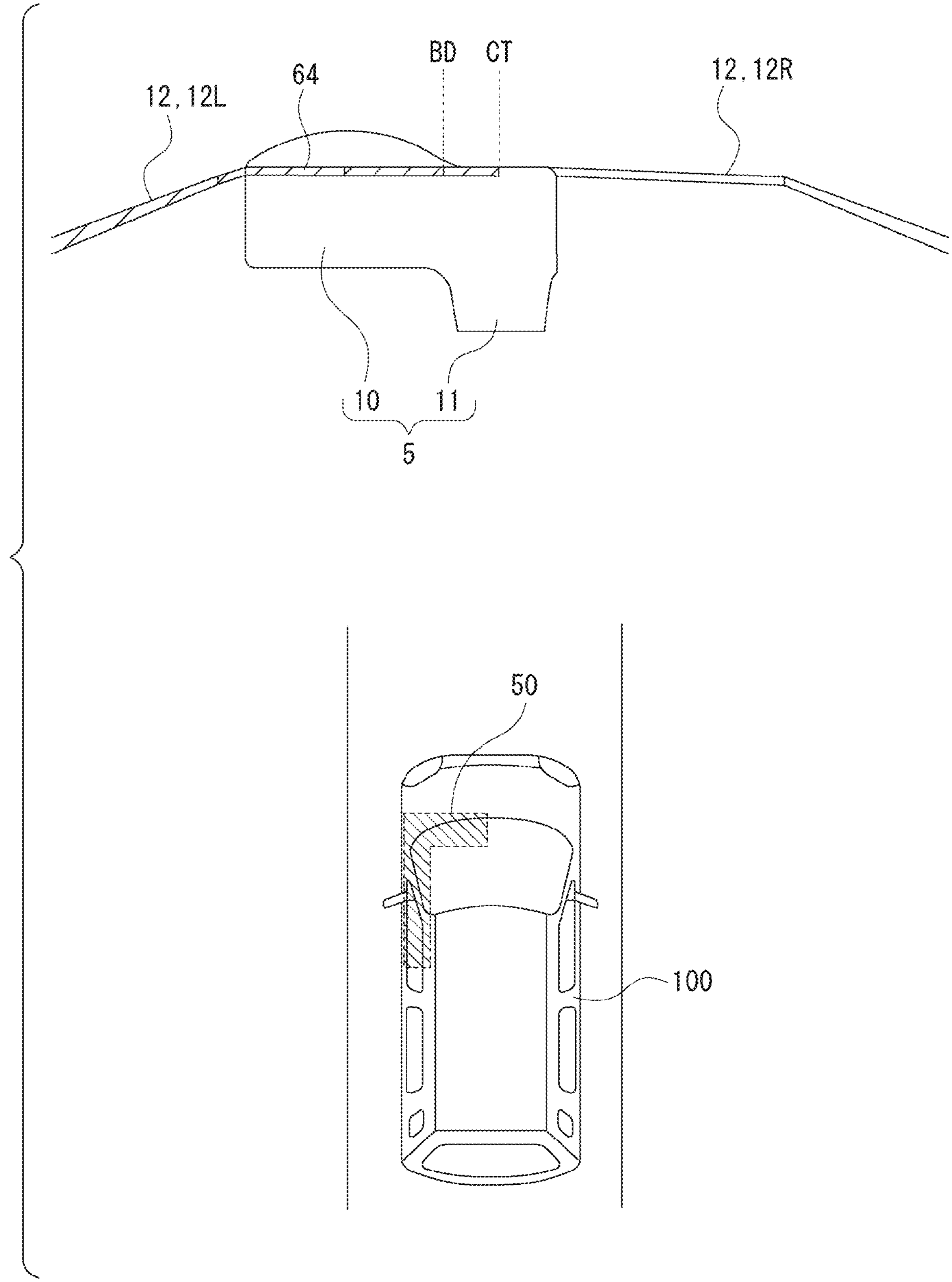
FIG. 9 is an explanatory diagram of cooperative light emission for reporting to a driver according to the embodiment.

FIG. 9 illustrates cooperative light emission for reporting targeted at the driver illustrated in the fourth diagram from the top in FIG. 5. For example, as illustrated in the lower part of FIG. 9, the vehicle control system 1 designates the left front area in the vehicle interior as the light-emission reporting zone 50 for the ambient light 12 since the reporting is targeted at the driver.

In this case, the light-emission reporting zone 50 designated by the vehicle control system 1 is on the left side of the vehicle center line CT. That is, the area on the left side of the vehicle center line CT in the CID 11 and the ambient light 12L are included in the light-emission reporting zone 50. The area on the left side of the display boundary BD may be included instead of the area on the left side of the vehicle center line CT.

The vehicle control system 1 performs the control described in the fourth diagram from the top in FIG. 5. For example, as illustrated in the upper part of FIG. 9, the ambient light 12L is caused to emit yellow light, the ambient light 12R is caused to provide normal light emission, and the CID 11 and the meter display unit 10 are caused to provide the linear display 64 in yellow. This makes it easy to recognize that the reporting is targeted at the driver in particular. In the example of FIG. 9, the linear display 64 extends to the vehicle center line CT.

Figure 10:
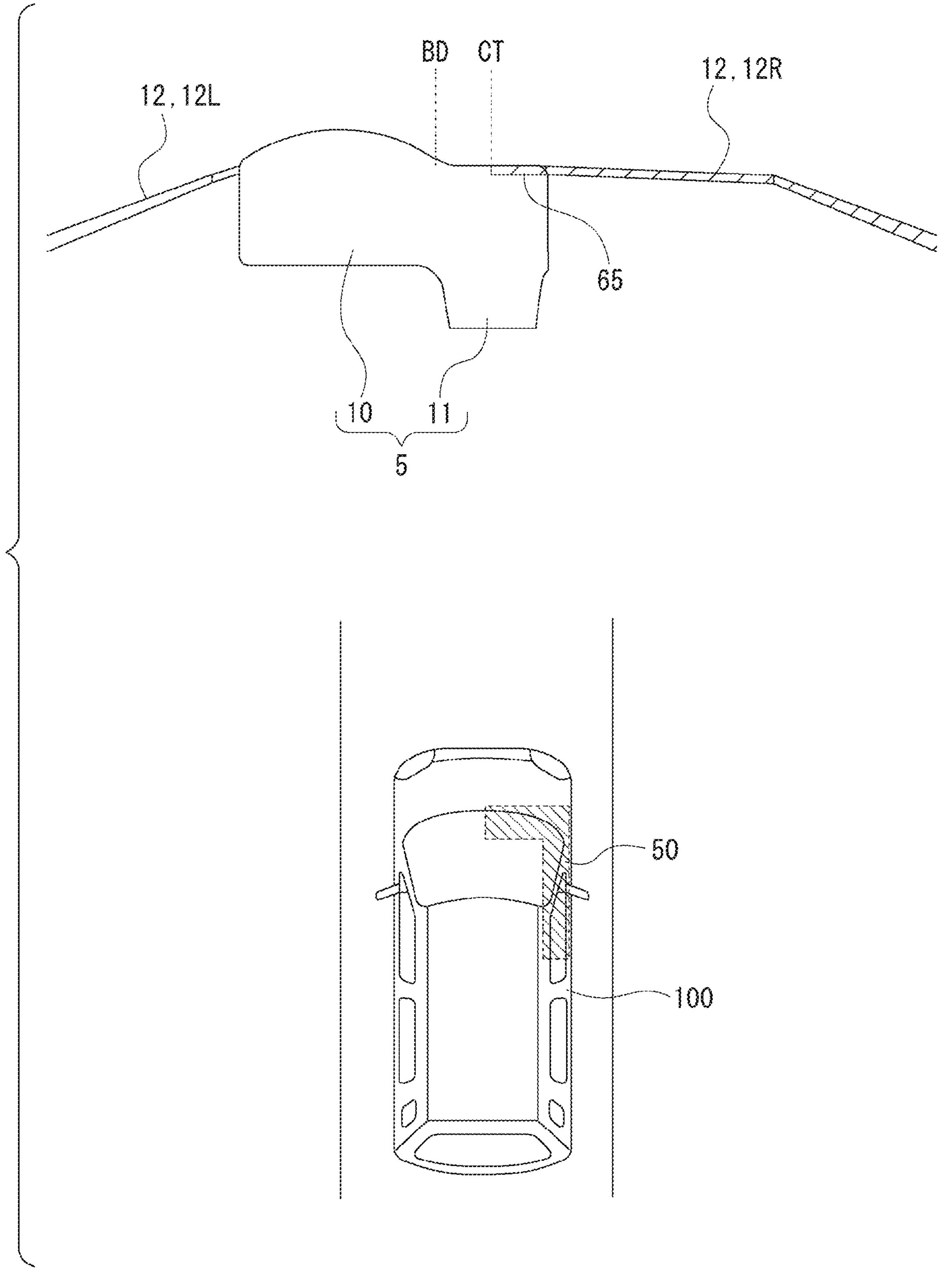
FIG. 10 is an explanatory diagram of cooperative light emission for reporting to a passenger's seat occupant according to the embodiment.

FIG. 10 illustrates cooperative light emission for reporting targeted at the passenger's seat occupant illustrated in the fifth diagram from the top in FIG. 5. For example, as illustrated in the lower part of FIG. 10, the vehicle control system 1 designates the right front area in the vehicle interior as the light-emission reporting zone 50 for the ambient light 12 since the reporting is targeted at the passenger's seat occupant.

In this case, the light-emission reporting zone 50 designated by the vehicle control system 1 is on the right side of the vehicle center line CT. That is, the area on the right side of the vehicle center line CT in the CID 11 and the ambient light 12R are included in the light-emission reporting zone 50.

The vehicle control system 1 performs the control described in the fifth diagram from the top in FIG. 5. For example, as illustrated in the upper part of FIG. 10, the ambient light 12R is caused to emit yellow light, the ambient light 12L is caused to provide normal light emission, and the CID 11 is caused to provide the linear display 65 in yellow. This makes it easy to recognize that the reporting is targeted at the passenger's seat occupant in particular.

The above descriptions are presented as examples. When a trigger for reporting by the ambient light 12 is generated, the vehicle control system 1 designates the light-emission reporting zone 50 in response to the trigger, controls the ambient light source 4 and the display 5 based on zone setting, and provides cooperative light emission as in the above examples.

Hereinafter, an example of a process by the vehicle control system 1 will be described with reference to FIG. 11.

Figure 11:
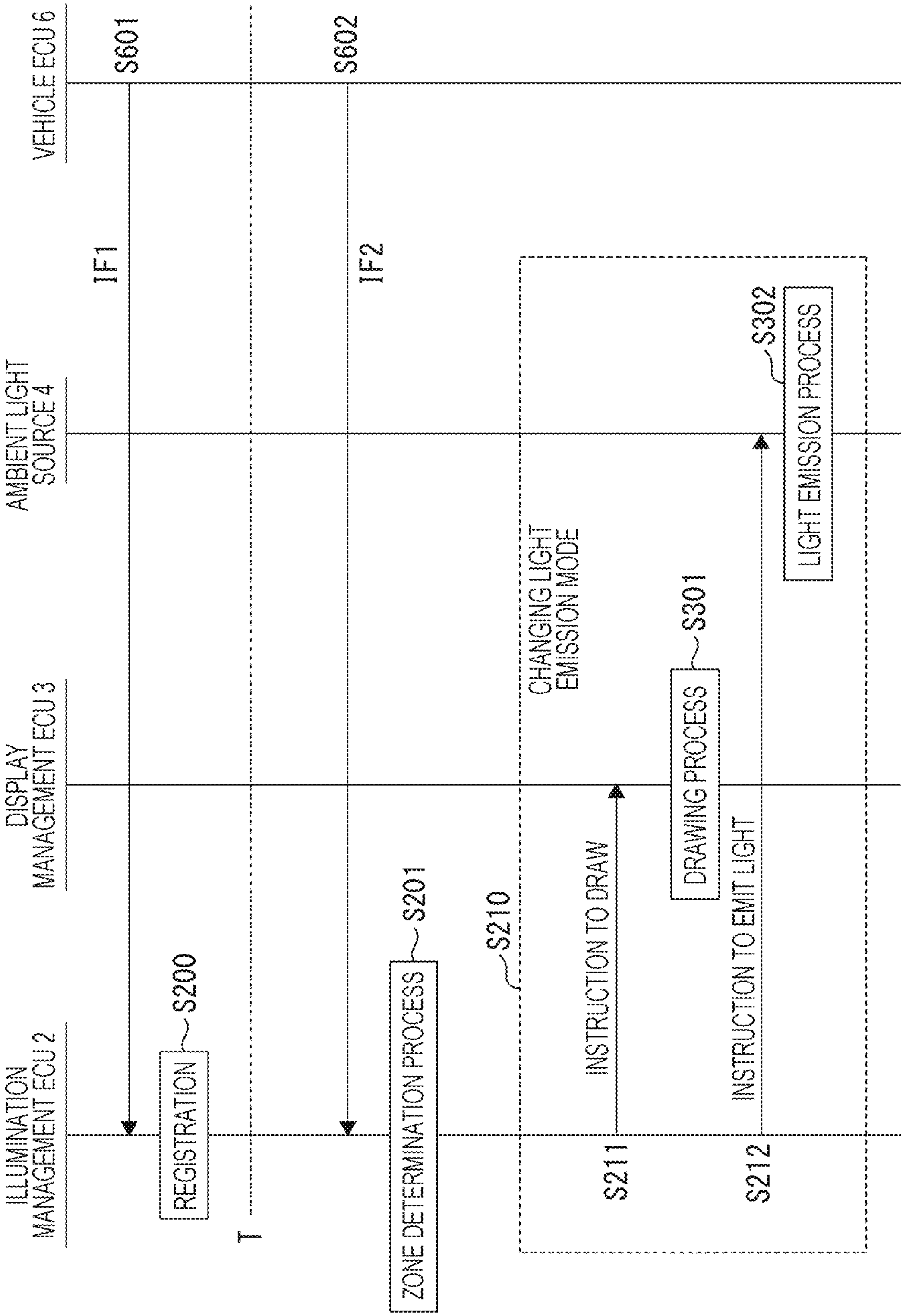
FIG. 11 is a flowchart of a cooperative light emission process according to the embodiment.

FIG. 11 illustrates a processing sequence of the illumination management ECU 2, the display management ECU 3, the ambient light source 4, and the vehicle ECU 6 in the vehicle control system 1. It should be understood that the display 5 performs display in accordance with a drawing process by the display management ECU 3 and thus is not illustrated. The ambient light source 4 is illustrated because the ambient light source 4 controls the light emission mode of each portion of the ambient light 12 in response to an instruction to emit light from the illumination management ECU 2.

As an initial setting process, the vehicle ECU 6 transmits the vehicle setting information IF1 to the illumination management ECU 2 in step S601.

In step S200, the illumination management ECU 2 performs a registration process of the vehicle setting information IF1.

The vehicle setting information IF1 includes information regarding where the steering wheel is located, that is, whether the driver's seat is on the right-hand side or the left-hand side, information regarding the arrangement of the meter display unit 10 and the CID 11 in the display 5, and information regarding the vehicle width. These pieces of information are fixed for the vehicle 100, and these pieces of information are known, for example, at a stage before the shipment of the vehicle 100.

The illumination management ECU 2 acquires these pieces of information and performs the registration process in the beginning. That is, the illumination management ECU 2 calculates the position of the vehicle center line CT based on the vehicle setting information IF1, divides the vehicle interior into the areas on the right side and the left side of the vehicle center line CT, and registers the areas. In this way, the position of the vehicle center line CT, the position of the display boundary BD, and the like in the display 5 are grasped.

The above process may be performed once, for example, at a stage before the shipment of the vehicle 100.

The processes below the dashed line T in FIG. 11 are normally repeated.

Each time the vehicle ECU 6 determines in response to a detection signal from the detector 7 that a trigger for reporting by the ambient light 12 has been generated, the vehicle ECU 6 transmits the reporting target information IF2 to the illumination management ECU 2 in step S602.

Examples of the reporting target information IF2 include the following detection information to issue a warning.

Deviation from the lane during driving

Detection of an obstacle to driving

Detection of a possible collision

Warning against door opening (warning against door opening due to approach of a motorcycle or the like from behind)

Examples of the reporting target information IF2 also include information regarding a trigger to issue a response to the occupant.

Response to any operation by the occupant

Response to a question (utterance) from the occupant

Reporting in conjunction with an application providing display in the CID or the like Upon acquiring detection information serving as a trigger for reporting by the ambient light 12, for example, from the detector 7, the vehicle ECU 6 transmits the reporting target information IF2 containing information including the content of the trigger, the direction in which an event has occurred, and the position (seat) of an occupant to be reported to.

In response to receiving the reporting target information IF2, the illumination management ECU 2 performs a zone determination process in step S201. This is a process of designating a zone, such as the light-emission reporting zone 50 illustrated in FIGS. 6 to 10, in which reporting by light emission is performed by the ambient light 12 and the display 5.

After the zone is designated, the illumination management ECU 2 performs a process of changing the light emission mode in step S210. That is, control is performed to change the ambient light 12 from the normal light emission illustrated in the uppermost diagram in FIG. 5 to, for example, the light emission modes for reporting illustrated in the second diagram from the top and the diagrams below the second diagram.

To be more specific, the illumination management ECU 2 issues an instruction to draw to the display management ECU 3 in step S211. In the instruction to draw, a certain area is specified in the display 5 according to the light-emission reporting zone 50, and the display 5 is caused to display a line drawing in the same light emission mode as the ambient light 12.

Based on the instruction, the display management ECU 3 performs a drawing process in step S301, and, for example, the linear display (60, 63, 64, 65, 66 or the like) is provided in the display 5.

The instruction to draw in step S211 may include an instruction to draw the alerting display 61 or 62. The illumination management ECU 2 provides an instruction indicating a position (area) at which drawing is provided in the display 5 and a light emission mode of the drawing.

Based on the instruction, the display management ECU 3 also performs a drawing process of the alerting display 61 or 62 in step S301, and, for example, the alerting display 61 or 62 in the zone ZR or the zone ZL in the meter display unit 10 is provided.

In step S212, the illumination management ECU 2 provides an instruction to emit light to the ambient light source 4. The instruction to emit light includes information regarding a zone where the ambient light 12 is caused to emit light and a light emission mode in which the ambient light 12 in each zone is caused to emit light based on the light-emission reporting zone 50 that has been designated.

In response to such an instruction to emit light, in step S302, the ambient light source 4 causes LEDs included in the ambient light 12 to emit light in each zone. In this way, as described with reference to FIGS. 5 and 6 to 10, the ambient light 12 emits light in a required light emission mode for each zone.

The above-described processes are performed, and thus the cooperative light emission is provided by the ambient light 12 and the display 5 when any trigger for reporting is generated.

According to the embodiment described above, the following effects can be obtained.

The vehicle 100 according to the embodiment includes the ambient light 12 having a linear portion extending at least in the vehicle transverse direction in the vehicle interior and the display 5 disposed in the dashboard so as to divide or cover a part of the linear portion of the ambient light 12.

The vehicle control system 1 includes one or more processors and a storage medium storing a program to be executed by the one or more processors. The program includes one or more instructions, and the one or more instructions are configured to cause the one or more processors to perform the following processes. The processes include a designating process of designating the light-emission reporting zone 50 in the vehicle interior according to the direction or the position related to the reporting and a control process of causing the ambient light 12 and the display 5 to perform cooperative light emission in the light-emission reporting zone 50 designated by the designating process.

In this way, if the linear portion of the ambient light 12 is divided by providing the display 5, an issue is addressed in which the driver has difficulty in recognizing reporting by the ambient light 12 at the time of driving while gazing forward.

Further, since the driver is able to recognize the reporting by the ambient light 12 in the meter display unit 10 at the front, the driver can maintain a forward-facing gaze, which is useful in facilitating safe driving.

The vehicle control system 1 according to the embodiment is configured to perform the control process of causing the display 5 in an area included in the light-emission reporting zone 50 to perform light emission in the same light emission mode as the ambient light 12 in an area included in the light-emission reporting zone 50.

In the display 5, the meter display unit 10 and the CID 11 are caused to provide light emission display in the same light emission mode as the ambient light 12 for reporting, that is, in the same color, the same brightness, or the same light emission cycle. This enables the occupant to intuitively and easily recognize that the meter display unit 10 and the CID 11 emit light in cooperation with the ambient light 12 and that reporting is provided by the ambient light 12.

The vehicle control system 1 according to the embodiment is configured to perform the control process of causing the display 5 in an area included in the light-emission reporting zone 50 to perform light emission in a linear region extended from a linear portion of the ambient light 12 in the same light emission mode as the ambient light 12 in an area included in the light-emission reporting zone 50.

The display 5 reproduces the state of light emission by the ambient light 12, which has a linear portion, and performs light emission. Also in this case, the display 5 may be caused to provide light emission display in the same light emission mode, that is, in the same color, the same brightness, or the same light emission cycle. This enables the ambient light 12 to provide light emission display as if the linear portion of the ambient light 12 divided by the display 5 continuously extends into the display 5. This enables the occupant to easily recognize the reporting by the ambient light 12. In addition, since the ambient light 12 is reproduced in the meter display unit 10 and the like at the front, the driver can recognize the reporting by the ambient light 12 while maintaining a forward-facing gaze.

In the example described above, the vehicle control system 1 according to the embodiment is configured to, in response to an event to be reported being detected outside the vehicle 100, perform the designating process of designating as the light-emission reporting zone 50 a zone in the vehicle interior corresponding to a direction of the event as viewed from the vehicle 100, and the direction of the event is regarded as the direction or the position related to reporting.

As illustrated in FIGS. 6, 7, and 8, in response to the detection of an event outside the vehicle 100 including, for example, an event such as deviation from the lane, an obstacle to driving, or a possible obstacle related to door opening, an area corresponding to the direction of the event is designated as the light-emission reporting zone 50, and reporting regarding the direction is provided. In the present embodiment, in cooperation with the display 5, the ambient light 12 provides such reporting of an event outside the vehicle 100, and the driver is able to recognize a direction to pay attention to even while maintaining a forward-facing gaze. In particular, in consideration of the driver's field of view, also including the zones ZR and ZL of the meter display unit 10 in the light-emission reporting zone 50 is useful to alert the driver gazing forward.

In the example described above, the vehicle control system 1 according to the embodiment is configured to perform the designating process of designating as the light-emission reporting zone 50 a zone in the vehicle interior corresponding to a seat in which an occupant to be reported to is seated in the vehicle 100, and the seat is regarded as the direction or the position related to reporting.

In this way, the reporting by the ambient light 12 can be provided so as to clearly indicate the occupant to be reported to. For example, the reporting targeted at the driver can be provided in the zone corresponding to the driver's seat, and the reporting targeted at the passenger's seat occupant can be provided in the zone corresponding to the passenger's seat. As a result, in the reporting by the ambient light 12, the occupant to be reported to can be expressed.

There may be a zone setting in which reporting is targeted at an occupant in a rear seat. For example, such a zone setting can be applied to a case where the ambient light 12 is disposed in a door portion of a rear seat, a ceiling portion, or the like. Further, the technique of the present embodiment can be applied when a part of the linear portion of the ambient light 12 is divided or covered by a display disposed for an occupant in a rear seat. In such a case, reporting is provided by cooperative light emission by the ambient light 12 and the display.

According to the present disclosure, the display disposed so as to divide or cover a part of the linear portion of the ambient light performs cooperative light emission in the light-emission reporting zone suitable for reporting, and thus the driver can easily recognize the reporting by the ambient light.

The vehicle control system 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle control system 1 including the vehicle ECU 6, the illumination management ECU 2, and the display management ECU 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle control system configured to be applied to a vehicle, the vehicle control system comprising:

one or more processors; and a storage medium storing a program configured to be executed by the one or more processors, wherein the vehicle includes a dashboard located at a front of a vehicle interior of the vehicle, an ambient light, and a display, the display includes a center information display disposed in the dashboard, the ambient light includes a left ambient light on a left side of the display and a right ambient light on a right side of the display, the left ambient light and the right ambient light each having a linear portion extending in a vehicle transverse direction in the vehicle interior, the display is disposed in the dashboard between the left ambient light and the right ambient light to divide or cover a part of the linear portion of the ambient light, a left-side zone and a right-side zone are divided by a vehicle center line, the left-side zone including an area on a left side of the vehicle center line in the center information display and the left ambient light, the right-side zone including an area on a right side of the vehicle center line in the center information display and the right ambient light, the program comprises one or more instructions, and the one or more instructions are configured to cause the one or more processors to perform:

a designating process of, in response to an event to be reported being detected outside the vehicle, designating a light-emission reporting zone in the vehicle interior by selecting one of the left-side zone and the right-side zone according to a direction of the event as viewed from the vehicle; and a control process of causing the ambient light and the display to perform cooperative light emission in the light-emission reporting zone designated by the designating process, wherein the control process includes:

when the right-side zone is designated as the light-emission reporting zone, causing the right ambient light to emit light in a light emission mode, causing the area on the right side of the vehicle center line in the center information display to provide a linear display extending from the right ambient light in the same light emission mode as the right ambient light, and causing the left ambient light not to emit light for the event, and when the left-side zone is designated as the light-emission reporting zone, causing the left ambient light to emit light in a light emission mode, causing the area on the left side of the vehicle center line in the center information display to provide a linear display extending from the left ambient light in the same light emission mode as the left ambient light, and causing the right ambient light not to emit light for the event.

2. The vehicle control system according to claim 1, wherein the same light emission mode has at least one same parameter selected from color, brightness, and cycle.

3. The vehicle control system according to claim 1, wherein the linear display has a straight line, a curved line, or a mixture of a straight line and a curved line.

4. A vehicle control system configured to be applied to a vehicle, the vehicle control system comprising:

one or more processors; and a storage medium storing a program configured to be executed by the one or more processors, wherein the vehicle includes a dashboard located at a front of a vehicle interior of the vehicle, an ambient light, and a display, the display includes a meter display unit and a center information display disposed in the dashboard, the ambient light includes a left ambient light on a left side of the display and a right ambient light on a right side of the display, the left ambient light and the right ambient light each having a linear portion extending in a vehicle transverse direction in the vehicle interior, the display is disposed in the dashboard between the left ambient light and the right ambient light to divide or cover a part of the linear portion of the ambient light, a left-side zone and a right-side zone are divided by a vehicle center line, the left-side zone including an area on a left side of the vehicle center line in the center information display and the left ambient light, the right-side zone including an area on a right side of the vehicle center line in the center information display and the right ambient light, the meter display unit includes a left zone and a right zone, the program comprises one or more instructions, the one or more instructions are configured to cause the one or more processors to perform:

a designating process of, in response to an event to be reported being detected outside the vehicle, designating a light-emission reporting zone in the vehicle interior according to a direction of the event as viewed from the vehicle, and the designating process including:

when the direction of the event corresponds to a right side of the vehicle, designating, as the light-emission reporting zone, the right-side zone and the right zone of the meter display unit, and when the direction of the event corresponds to a left side of the vehicle, designating, as the light-emission reporting zone, the left-side zone and the left zone of the meter display unit; and a control process of causing the ambient light and the display to perform cooperative light emission in the light-emission reporting zone designated by the designating process, and the control process includes:

when the right-side zone and the right zone of the meter display unit are designated as the light-emission reporting zone, causing the right ambient light to emit light in a light emission mode, causing the area on the right side of the vehicle center line in the center information display to provide a linear display extending from the right ambient light in the same light emission mode as the right ambient light, causing the right zone of the meter display unit to provide a display in the same light emission mode as the right ambient light, and causing the left ambient light not to emit light for the event, and when the left-side zone and the left zone of the meter display unit are designated as the light-emission reporting zone, causing the left ambient light to emit light in a light emission mode, causing the area on the left side of the vehicle center line in the center information display to provide a linear display extending from the left ambient light in the same light emission mode as the left ambient light, causing the left zone of the meter display unit to provide a display in the same light emission mode as the left ambient light, and causing the right ambient light not to emit light for the event.

5. The vehicle control system according to claim 4, wherein the same light emission mode has at least one same parameter selected from color, brightness, and cycle.

6. The vehicle control system according to claim 4, wherein the linear display has a straight line, a curved line, or a mixture of a straight line and a curved line.

7. A vehicle control system configured to be applied to a vehicle, the vehicle control system comprising:

one or more processors; and a storage medium storing a program configured to be executed by the one or more processors, wherein the vehicle includes a dashboard located at a front of a vehicle interior of the vehicle, an ambient light, and a display, the display includes a center information display disposed in the dashboard, the ambient light includes a driver-seat-side ambient light disposed on a driver's seat side of the display and a passenger-seat-side ambient light disposed on a passenger's seat side of the display, the driver-seat-side ambient light and the passenger-seat-side ambient light each having a linear portion extending in a vehicle transverse direction in the vehicle interior, the display is disposed in the dashboard between the driver-seat-side ambient light and the passenger-seat-side ambient light to divide or cover a part of the linear portion of the ambient light, a driver-seat-side zone and a passenger-seat-side zone are divided by a vehicle center line, the driver-seat-side zone including an area on a driver's seat side of the vehicle center line in the center information display and the driver-seat-side ambient light, the passenger-seat-side zone including an area on a passenger's seat side of the vehicle center line in the center information display and the passenger-seat-side ambient light, the program comprises one or more instructions, and the one or more instructions are configured to cause the one or more processors to perform:

a designating process of designating a light-emission reporting zone in the vehicle interior by selecting one of the driver-seat-side zone and the passenger-seat-side zone according to a seat in which an occupant to receive reporting is seated in the vehicle; and a control process of causing the ambient light and the display to perform cooperative light emission in the light-emission reporting zone designated by the designating process, and the control process includes:

when the driver-seat-side zone is designated as the light-emission reporting zone, causing the driver-seat-side ambient light to emit light in a reporting light emission mode, causing the area on the driver's seat side of the vehicle center line in the center information display to provide a linear display extending from the driver-seat-side ambient light in the same reporting light emission mode as the driver-seat-side ambient light, and causing the passenger-seat-side ambient light not to emit light in the reporting light emission mode, and when the passenger-seat-side zone is designated as the light-emission reporting zone, causing the passenger-seat-side ambient light to emit light in a reporting light emission mode, causing the area on the passenger's seat side of the vehicle center line in the center information display to provide a linear display extending from the passenger-seat-side ambient light in the same reporting light emission mode as the passenger-seat-side ambient light, and causing the driver-seat-side ambient light not to emit light in the reporting light emission mode.

* * * * *